Figure 1:
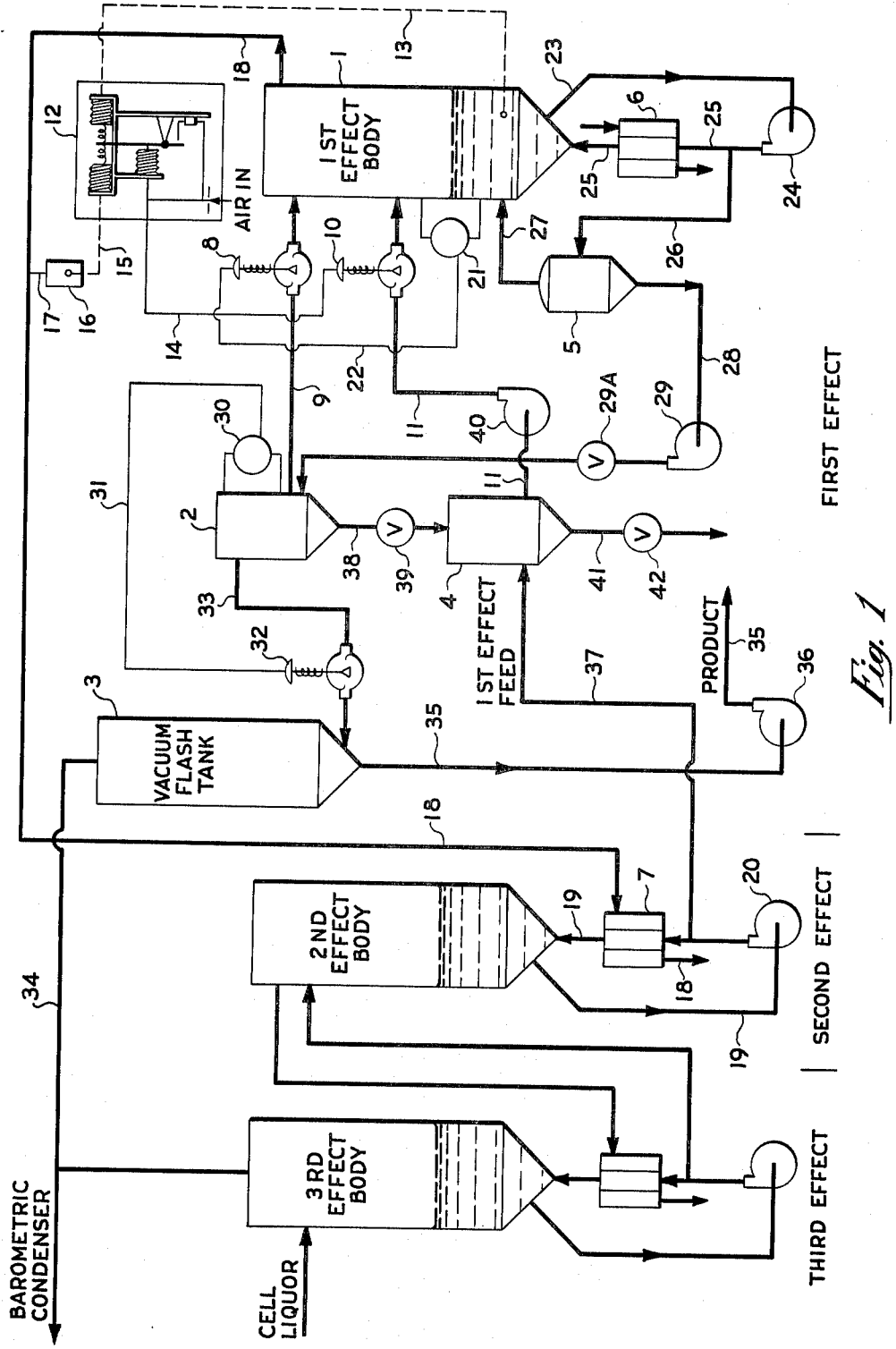

United States Patent Office

3,204,688
Patented Sept. 7, 1965

3,204,688
EVAPORATION CONTROL METHOD
Joseph M. Hildyard, Youngstown, N.Y., assignor to Hooker Chemical Corporation, Niagara Falls, N.Y., a corporation of New York
Filed Aug. 30, 1962, Ser. No. 220,427
The portion of the term of the patent subsequent to Sept. 4, 1979, has been disclaimed and dedicated
5 Claims. (Cl. 159—47)

This is a continuation-in-part of my parent application S.N. 755,011, filed August 14, 1958, now Patent No. 3,052,289.

The present invention relates to a method of and an arrangement for regulating evaporators and like apparatus. More particularly, this invention relates to a method of and an instrumentation arrangement for regulating multiple-effect evaporators having a multiplicity of side streams or recycles used in the concentration of liquids used in industries such as the chlor-alkali industry and the sugar industry.

There are cases in which the ordinary method of regulating the fluid supply to an evaporator or like apparatus involves certain difficulties in obtaining a stabilized process owing to the time lag between the initiation of a certain regulating actuation and the achievement of the desired result. If, for instance, the temperature or the concentration of a substance in an evaporator body is too low, certain valve means may be actuated in order to balance the flow of fluids going to and from the evaporator to the available heat energy supplied to the evaporator body. The effect of this balance of flow is to cause a longer residence time of the evaporator contents to the supply of heat energy. This balancing actuation normally continues until the desired result is obtained, that is, in the present instance until a predetermined concentration of the substance to be heated within the evaporator body is reached. Owing to the capacity and storage effects existent in the evaporator body and the vessels to which it is connected by recycle side streams, there exists a time lag, that is, a comparatively long time between the initiation of a certain regulating actuation and the accomplishment of the desired result, whereby "over and under" regulation occurs.

An object of my invention is to provide an improved method of and an arrangement for regulating such evaporators whereby "over and under" regulation is substantially reduced consistent with providing certain desirable start-up characteristics of the process.

Another object of this invention is to achieve a more uniform and higher quality final product.

In S.N. 755,011, I have disclosed an improved method of, and an arrangement for, regulating multiple-effect evaporators having a multiplicity of side streams or recycles. Among these side streams are two-conduits for supplying fluids to an evaporator body, the first conduit supplying a first fluid of greater concentration than the second for supplying fluid from a prior effect and wherein valve means are provided in the conduits for regulating the admission of the fluids to be concentrated. Further, a third conduit, wherein heat energy has been transferred to the contained third fluid, supplies this third fluid to the evaporator to be concentrated. This fluid is substantially the same as the evaporator body contents. A fourth conduit provides the means for discharging generated vapor from the evaporator body. There is also a fifth conduit for discharging concentrated fluid from the evaporator body. In my parent case S.N. 755,011, a concentration responsive means, such as a temperature difference controller, actuates the valve in the first conduit supplying the first fluid of greater concentration and a liquid level responsive means in the evaporator body actuates the valve in the second conduit. In a preferred embodiment of S.N. 755,011, a totalizer is placed between the concentration responsive means and the liquid level responsive means, thereby obtaining a more level method of control.

I have now found a new method of controlling such multiple effect evaporation systems, which eliminates the need for a totalizer to level out the control responses of the concentration responsive means and the liquid level responsive means. I have found that a simpler more effective method of control can be accomplished by using the concentration responsive means, such as a temperature difference controller, to actuate the valve in the said second conduit supplying fluid from a prior effect and using the liquid level responsive means to actuate the valve in the said first conduit supplying a first fluid of greater concentration than the fluid in the evaporator body.

Figure 2:
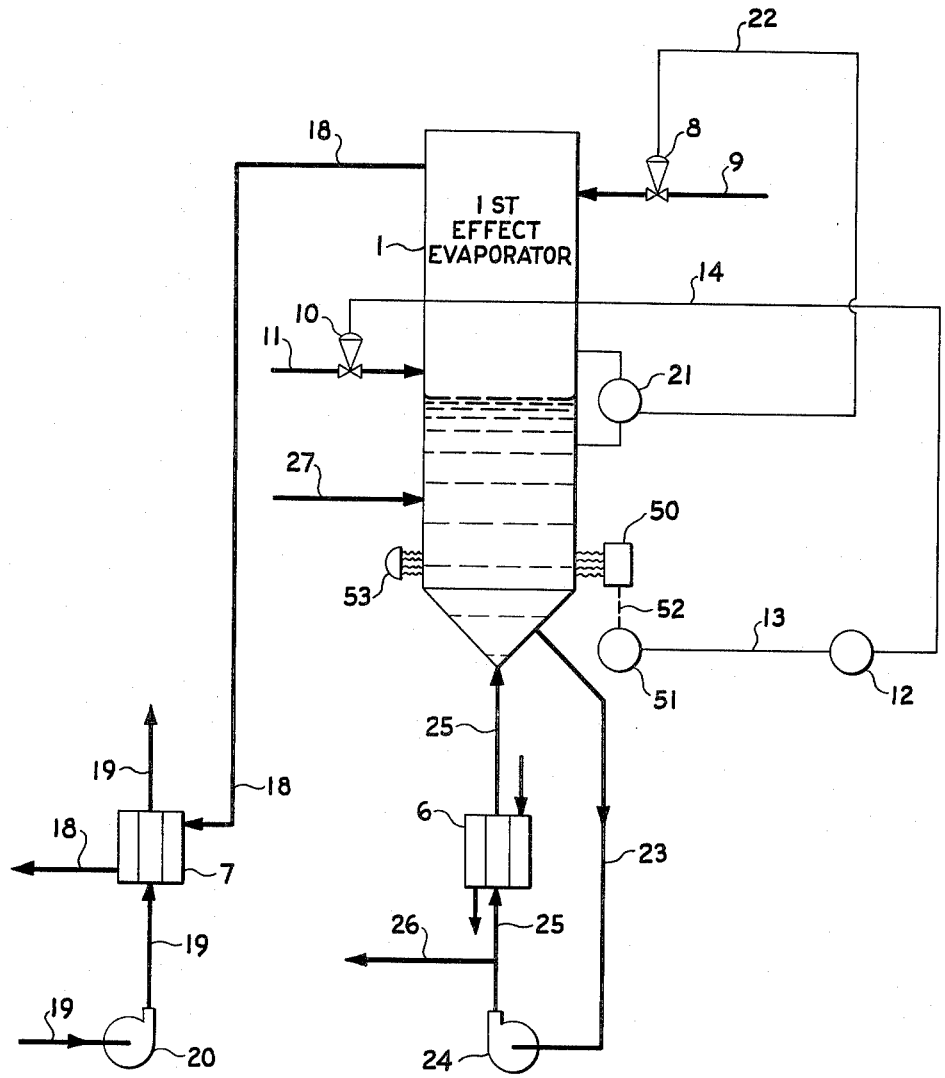
Figure 3:
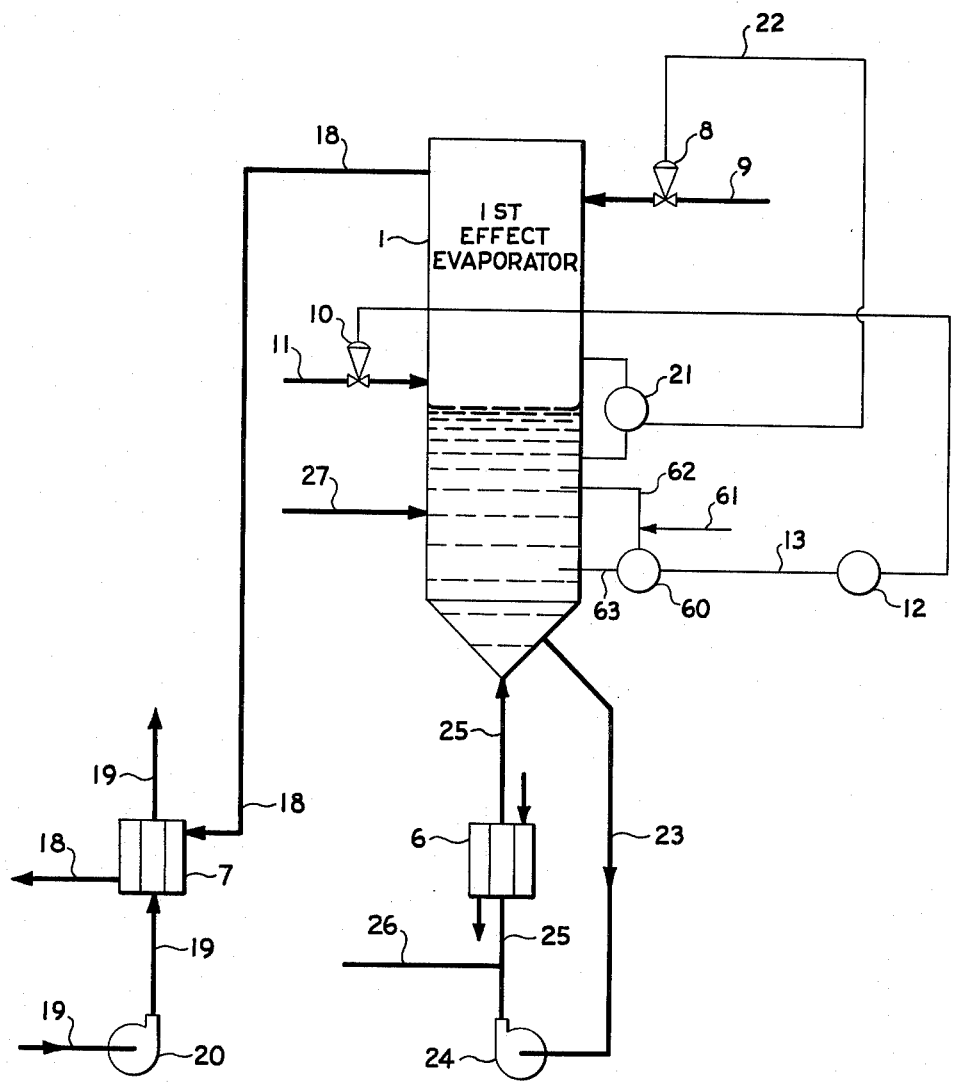

In order that this invention may be more easily understood, it will be described with reference to the attached drawings. FIGURE 1 illustrates a dagrammatic flow sheet of an embodiment embraced within the scope of this invention specifically used in the evaporation of cell liquor obtained from the electrolysis of brine. FIGURE 2 and FIGURE 3 illustrates a diagrammatic flow sheet of alternative embodiments embraced within the scope of this invention.

Referring to FIGURE 1 showing a counter-current triple-effect evaporating system: 1 is a first-effect evaporator body of a triple-effect evaporating system. 2 is a first-effect receiver for receiving material concentrated in the first-effect evaporator body 1. 3 is a vacuum flash tank receiving a portion of the decanted material from the first-effect receiver 2. 4 is a second-effect receiver which receives material concentrated in the second-effect evaporator body and slurry from the first-effect receiver 2 and feeds the decanted material to the first-effect evaporator body 1, the salt being fed to the third effect receiver or other vessel (not shown). 5 is a first-effect salt separator which partially decants material from the first-effect evaporator body 1, returning the liquid to the evaporator body 1 and the slurry to the first-effect receiver 2. 6 is a steam chest which supplies the heat energy to the material in the first-effect evaporator body 1. 7 is the steam chest of a second-effect evaporator and receives vapor evaporated from the first-effect evaporator body 1. 8 is a controlled valve returning a portion of the fluid from the the first-effect receiver 2 through line 9 to the first-effect evaporator body 1. 10 is a controlled valve feeding the fluid from the second-effect receiver 4 through line 11 to the first-effect evaporator body 1. 12 is a concentration controller utilizing temperature differences as a measure of concentration. Line 13 is a lead from the concentration controller 12 connected to a temperature element within the body of the first-effect evaporator 1. Line 14 is a lead from the concentration controller 12 connected to the controlled valve 10, instead of valve 8 in S.N. 755,011. Line 15 is a lead from the concentration controller 12 connected to a temperature element located in a desuperheating chamber 16 which in turn is connected by line 17 to the first-effect vapor line 18 leading from the first-effect evaporator body 1 to the second effect steam chest 7. The function of the desuperheater 16 is to obtain the saturation temperature of the vapor at the operating pressure of the evaporator 1 and establish a reference temperature whereby the boiling point rise of the liquid in the evaporator body 1 can be measured. Line 22 is a lead from a level controller 21 connected to the controlled valve 8, instead of valve 10 in S.N. 755,011.

Material from the second-effect evaporator body is recirculated through line 19 and pump 20. Concentrated material from the first-effect evaporator 1 is recirculated through line 23 by pump 24. A portion of this stream is returned to the first-effect evaporator body 1 through the steam chest 6 and line 25. The remaining portion is passed through line 26 to the first-effect salt separator 5. The fluid material of this separator 5 is returned through line 27 to the first-effect evaporator body 1. The slurry from the separator 5 is removed through line 28 and pump 29 and controlled by a valve 29a to the first-effect receiver 2. The slurry from the separator 5 is further separated in the first-effect receiver 2 into a liquor layer and a heavy salt slurry. The heavy salt slurry is fed through line 38 and valve 39 to the second-effect receiver 4. The liquor level of the first-effect receiver 2 is controlled by a level controller 30 and is connected through line 31 to a controlled valve 32 in a liquor line 33 withdrawing clarified material to the vacuum flash tank 3. Line 34 connects with a barometric condenser (not shown). The product is removed through line 35 and pump 36. Material labeled "1st Effect Feed") from the second-effect evaporator is passed through line 37 to the second-effect receiver 4.

My improved method of control for the system of FIGURE 1 is as follows. If, for instance, the concentration starts to rise within the body of evaporator 1 there results an increase in the temperature of the body liquid and the temperature difference between the thermal elements at the ends of leads 13 and 15 of controller 12. The control action is arranged so that this increase in temperature difference increases the feed rate to the evaporator body 1 by opening further valve 10. When valve 10 is opened, the level in evaporator 1 begins to rise, causing the level controller 21 to restrict further the flow of fluid through valve 8. When valve 8 is restricted, the level in receiver 2 starts to rise and level controller 30 opens valve 32 to lower the risen level in receiver 2. This simultaneously increases the product flow rate. The increase in the rate of product removal, coupled with the increase in feed rate to the evaporator body 1 causes the fluid in the first-effect evaporator body 1 to boil at a lower temperature and return its temperature difference and concentration to the predetermined set point.

In FIGURE 2 1 is the first-effect of a triple-effect evaporator system. 6 is a steam chest which supplies the heat energy of the material in the first-effect evaporator body 1. 7 is the steam chest of the second-effect evaporator (shown in FIGURE 1) and received vapor from the first-effect evaporator 1. 8 is the controlled valve recirculating the fluid from the first-effect receiver 2 (shown in FIGURE 1) through line 9 to the first-effect evaporator body 1. 10 is the controlled valve feeding the fluid from the second-effect receiver 4 (shown in FIGURE 1) through line 11 to the first-effect evaporator body 1. 12a is a concentration controller receiving impulses from the transmitter 51. Line 13 is a lead from the concentration controller 12a connected to the transmitter 51 of a radiation detector and transmitter 50 and 51 respectively. The detector 50 and the transmitter 51 are connected by an electrical lead 52. The radiation detector 50 is adapted to be sensitive to changes in intensity of radiation as caused by changes in evaporator 1 fluid concentration absorbing radiation omitted from a radiation source 53. Line 14 is a lead from the concentration controller 12a connected to controlled valve 10. Line 22 is a lead from the level controller 21 connected to valve 8. Material from the second-effect evaporator (shown in FIGURE 1) passes through line 19 and pump 20 to the second-effect evaporator body. Concentrated material is removed from the first-effect evaporator body 1 through lines 23 and pump 24. A portion of this stream is returned to the first-effect evaporator body 1 through steam chest 6. The remaining portion is passed through line 26 to the first-effect salt separator 5 (shown in FIGURE 1) and passes to the first-effect evaporator body 1.

In FIGURE 3, 1 is the first-effect of the triple-effect evaporator system. 6 is the steam chest which supplies the heat energy to the material in the first-effect evaporator body 1. 7 is the steam chest of the second-effect evaporator (shown in FIGURE 1) and receives vapor from the first-effect evaporator body 1. 8 is the controlled valve recirculating the fluid from the first-effect receiver 2 (shown in FIGURE 1) through line 9 to the first-effect evaporator body 1. 10 is the controlled valve feeding the fluid from the second-effect receiver 4 (shown in FIGURE 1) through line 11 to the first-effect evaporator body 1. 12a is a concentration controller receiving impulses from a specific gravity measuring means and transmitter 60. Line 13 is a lead from the concentration controller 12a connected to the transmitter of a specific gravity measuring means and transmitter 60. The specific gravity measuring measuring means has a water purge line 61 which provides a reference head of water on one side of its measuring element through reference leg 62. The other side of its measuring element is connected through sensing line 63 to a point lower in elevation than line 62 on the side of the evaporator whereby the said other side is subjected to the different density of the material within the evaporator. Line 14 is a lead from the concentration controller 12a connected to controlled valve 10. Line 22 is a lead from the level controller 21 connected to controlled valve 8. Material from the second-effect evaporator (shown in FIGURE 1) passes through line 19 and pump 20 to the second-effect evaporator body. Concentrated material is removed from the first-effect evaporator body 1 through line 23 and pump 24. A portion 25 of this stream is returned to the first-effect evaporator body 1 through steam chest 6. The remaining portion is passed through line 26 to the first-effect salt separator 5 (shown in FIGURE 1). Line 27 received fluid material from the first-effect salt separator 5 (shown in FIGURE 1) and passes it to the first-effect evaporator body 1.

The invention will be more fully understood by reference to the following examples which describes the manner in which the apparatus of this invention cooperate to produce the desired result.

What is desired to a "Product" from line 35 (of FIGURE 1) which is of a uniform predetermined concentration. It is also desired to maintain the liquid level and concentration in the evaporator 1 at predetermined values, depending on the desired "Product" and on the characteristics of the multiple-effect evaporation system.

If due to some process upset, such as an increase in feed rate through line 9 and valve 8, the liquid level should start to rise in the evaporator body 1, the level controller 21 output pressure rises, thereby causing valve 8 to restrict further.

Since the triple-effect system is countercurrent, the fluid in line 11 from the second effect evaporator is more dilute than the liquid within the evaporator body 1. The evaporator body 1 temperature will also tend to increase because of the increase in flow of more concentrated fluid feed in line 9 and valve 8; thus causing an increase in temperature difference between the evaporator body 1 temperature and its desuperheated vapor temperature at 16. The concentration controller 12 senses this through the thermal elements at the ends of leads 13 and 15 respectively, and its output pressure rises causing valve 10 to open further, admitting more dilute fluid from the second effect. I have found that with the simultaneous decrease in flow through valve 8 and line 9 and the increase in flow through line 11 and valve 10 it simultaneously causes the level in the evaporator body 1 to lower and bring the operating conditions in the evaporator body 1 back to their predetermined normal.

In FIGURE 1, if the temperature difference should decrease in evaporator body 1, the concentration controller 12 output pressure falls thereby causing valve 10 to close further thereby tending to cause the liquid level in the evaporator body 1 to drop. The output pressure of the level controller 21 decreases thereby causing valve 8 to open to admit more concentrated fluid at a greater rate through line 9 thereby tending to raise the liquid level. Since the fluid in line 11 is more concentrated than the evaporator body 1 fluid, the temperature returns to the set point.

From all the foregoing description it can be seen that many advantages are derived from my control means when compared with those methods used in the past. For instance, in FIGURE 1 a method used by some manufacturers was to control concentration of first-effect 1 by connecting the output of concentration controller 12 to valve 32. Valve 8 then was connected to the output of level controller 30. By this method a three-step lag was introduced to the system. For instance, if the concentration in 1 rises; first, controller 12 opens valve 32 reducing the level in the first-effect receiver 2; second, level controller 30 senses the level drop in receiver 2 and restricts valve 8 causing level in the first-effect evaporator body 1 to fall; third, level controller 21 senses the fallen level and opens valve 10 admitting new dilute feed from the previous effect returning the concentration to the control point. Therefore, when comparing my novel two-step method of control with the above three-step example, I have found that the deviations from a given concentration set point are of shorter duration and lesser extent, thereby giving a more uniform and higher quality feed product.

It is to be understood that I do not wish to be limited to the use of a temperature difference controller to measure or control the concentration of the fluid in multiple-effect evaporator body. Any other suitable means may be used. For instance, as shown in FIGURE 2, a radiation-density gauge can be used to measure the concentration of evaporator body 1 by measuring the absorptive effect of the fluid to radiation. Another means is to measure the specific gravity of the fluid in the evaporator 1 as shown in FIGURE 3. There are several other known means of measuring concentration depending on the fluid in the evaporator and I contemplate that these means may be adaptable to my invention as well.

It is to be understood that the above-described arrangements are simply illustrative of the application of the principles of this invention. Numerous other arrangements may be readily devised for the concentration of a fluid in a multiple-effect evaporator by those skilled in the art which will employ the principles of the invention and fall within the spirit and scope thereof.

I claim:
1. A method for regulating the concentration of the product and the liquid inventory of cell liquor obtained from the electrolysis of brine being evaporated in the product-effect of a multiple effect evaporation system wherein said product-effect evaporator includes an evaporator body having a liquid level responsive means, a product concentration responsive means, a first conduit having controlled valve means for feeding to said evaporator body dilute material derived from a prior effect, a second conduit having controlled valve means for returning to said evaporator body concentrated material derived from said evaporator body, and a third conduit for withdrawing vapor evolved from said fluid in said said evaporator body, which comprises: measuring the concentration of the contents of the evaporator body with the said product concentration responsive means and applying the control impulse of said product concentration responsive means to the said controlled valve means in the contents of said evaporator body in a manner to increase the flow of dilute material from the said prior effect with a body fluid concentration increase; and measuring the liquid level of the contents of the evaporator body with the said liquid level responsive means and applying the control impulse of the said liquid level responsive means to the said controlled valve means in the said second conduit to effect a change in the contents of the evaporator body in a manner to restore the contents to a predetermined level.

2. The method of claim 1 wherein the concentration of the contents of the evaporator body is measured by a product concentration responsive means sensing changes in the temperature difference between the temperature of evaporator body fluid and the temperature of the vapor being withdrawn from the said evaporator body through the said third conduit at its saturated condition at the pressure existing in the evaporator body.

3. The method of claim 1 wherein the concentration of the contents of the evaporator body is measured by a product concentration responsive means comparing the specific gravity of the evaporator body fluid with the specific gravity of water under the same hydrostatic pressure.

4. The method of claim 1 wherein the concentration of the contents of the evaporator body is measured by a product concentration responsive means sensing changes in the radiation intensity from a radiation source as caused by changes in the concentration of the contents of the evaporator body.

5. A method for regulating the concentration of the product and the liquid inventory of cell liquor obtained from the electrolysis of brine being evaporated in the product-effect of a multiple effect evaporation system wherein said product-effect evaporator includes an evaporator body and external recirculation means, said external recirculation means having a product-effect receiver for receiving concentrated fluid derived from said evaporator body having a liquid level responsive means, sive means and a conduit having controlled valve means for withdrawing clarified product therefrom, and said evaporator body having a liquid level responsive means, a product concentration responsive means, a first conduit having controlled valve means for feeding to said evaporator body dilute material derived from a prior effect, a second conduit having controlled valve means for returning to said evaporator body concentrated material derived from said evaporator body through said receiver and a third conduit for withdrawing vapor evolved from said fluid in said evaporator body and being in communication with a desuperheating chamber, which comprises: measuring the concentration of the contents of the evaporator body by the said product concentration responsive means sensing changes in the temperature difference between the temperature of the evaporator body fluid and the temperature of the vapor in its saturated condition in the said desuperheater at the pressure existing in the evaporator body and applying the control impulse of said product concentration responsive means to the said controlled valve means in said first conduit to effect a change of concentration in the contents of said evaporator body in a manner to increase the flow of dilute material from the said prior effect with a body fluid concentration increase; and measuring the liquid level of the contents of the evaporator body with the said liquid level responsive means and applying the control impulse of the said liquid level responsive means to the said controlled valve means in the said second conduit to effect a change in the contents of the evaporator body in a manner to restore the contents to a predetermined level, measuring the liquid level of the contents of said receiver with its said liquid level responsive means and applying the control impulse of its said liquid level responsive means to the said controlled valve means in said receiver withdrawal conduit, whereby excess clarified concentrated fluid from the receiver is withdrawn as product through the said withdrawal conduit.

References Cited by the Examiner
UNITED STATES PATENTS 378,843   2/88  Lille _____ 159—44 X
559,857   5/96  Lillie _____ 159—44

(Other references on following page)

UNITED STATES PATENTS

| | | | |
|---|---|---|---|
| 2,073,825 | 3/37 | Beck et al. | 159—44 |
| 2,135,512 | 11/38 | Holven | 159—44 |
| 2,287,995 | 6/42 | Haugh | 150—44 |
| 2,304,150 | 12/42 | Crawford | 159—44 |
| 2,745,484 | 5/56 | Eckstrom | 159—44 |
| 2,850,086 | 9/58 | Sanscrainte | 159—44 |
| 2,900,334 | 8/59 | Miller. | |
| 2,931,433 | 5/60 | Martz | 159—44 |
| 2,954,821 | 10/60 | Baumann et al. | 159—26 X |
| 2,985,565 | 5/61 | Bellinger. | |
| 3,052,289 | 9/62 | Hildyard | 159—44 X |

NORMAN YUDKOFF, *Primary Examiner.*

GEORGE D. MITCHELL, *Examiner.*

UNITED STATES PATENT OFFICE
CERTIFICATE OF CORRECTION

Patent No. 3,204,688                          September 7, 1965

Joseph M. Hildyard

It is hereby certified that error appears in the above numbered patent requiring correction and that the said Letters Patent should read as corrected below.

Column 2, line 21, for "dagrammatic" read -- diagrammatic --; column 3, line 20, for "labeled" read -- (labeled --; column 4, line 16, strike out "measuring"; line 41, for "to a" read -- is a --; column 5, line 60, strike out "said", second occurrence; line 65, after "in" insert -- said first conduit to effect a change of concentration in --; column 6, lines 29 and 30, strike out "having a liquid level responsive means, sive means" and insert instead -- said receiver having liquid level responsive means --.

Signed and sealed this 6th day of December 1966.

(SEAL)
Attest:

ERNEST W. SWIDER                        EDWARD J. BRENNER
Attesting Officer                         Commissioner of Patents